United States Patent

Evans et al.

[11] Patent Number: 6,025,722
[45] Date of Patent: Feb. 15, 2000

[54] AZIMUTHALLY SEGMENTED RESISTIVITY MEASURING APPARATUS AND METHOD

[75] Inventors: Martin T. Evans, Norwich; Andrew R. Burt, Lowestoft, both of United Kingdom

[73] Assignee: Western Atlas International, Inc., Houston, Tex.

[21] Appl. No.: 08/814,753

[22] Filed: Mar. 7, 1997

[51] Int. Cl.[7] ............................... G01U 3/18; G01U 3/06; G01U 3/02
[52] U.S. Cl. ............................... 324/373; 324/374
[58] Field of Search .................... 324/373, 374, 324/375, 366, 367, 371

[56] References Cited

U.S. PATENT DOCUMENTS 3,060,373   10/1962   Doll ........................................ 324/374

Primary Examiner—Walter E. Snow
Attorney, Agent, or Firm—Richard A. Fagin

[57] ABSTRACT

An instrument for measuring resistivity of earth formations within azimuthal segments. The instrument includes azimuthally separated measure electrodes placed in contact with the wall of a wellbore penetrating the earth formations. The electrodes are placed in contact with the wall by springs, hydraulics or similar mechanisms. A guard electrode surrounds each measure electrode. The instrument includes a booster current electrode axially spaced apart from the guard electrodes. An insulator axially separates the guard electrodes from the booster electrode. Monitor electrodes are disposed on the exterior of the insulator. A first bucking current circuit is connected to the guard electrodes. The first bucking current constrains the flow of measuring currents from each measure electrode to a path substantially perpendicular to the axis of the instrument. A booster current circuit is connected to the booster electrode. The booster current circuit is controllably operated to maintain substantially zero voltage drop across the monitor electrodes. The instrument includes first measuring current sources each connected to one of the measure electrodes, and circuits for measuring voltage and current emitted through each of the measure electrodes. The resistivity of the segment in contact with each measure electrode can be determined from the voltage and current. In a preferred embodiment, the lengths of the booster electrode, insulator and guard electrodes are selected to enable determination of resistivity without having symmetric flow of bucking currents about the axis of the instrument with respect to the measure electrodes.

11 Claims, 5 Drawing Sheets

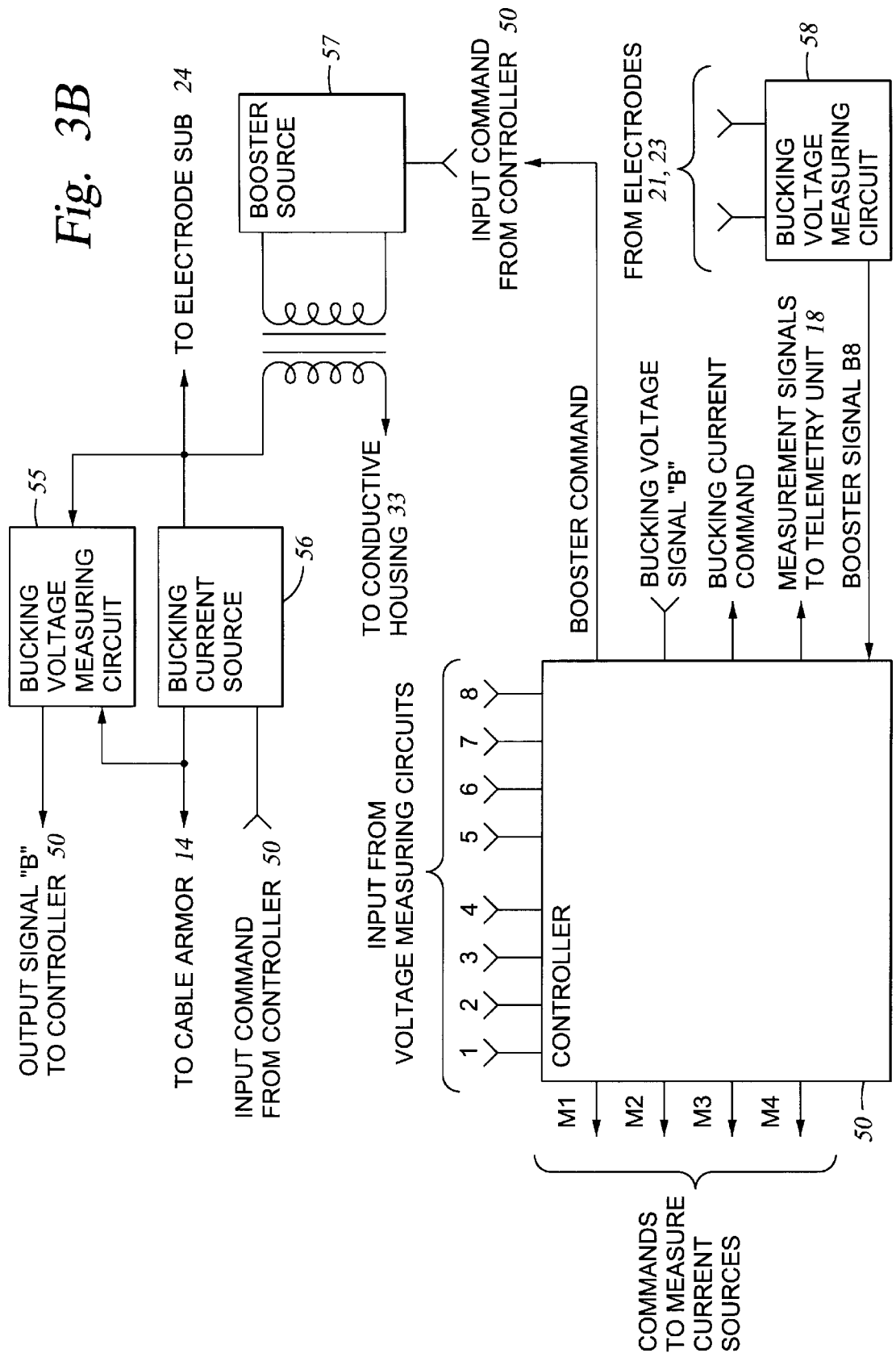

AZIMUTHALLY SEGMENTED RESISTIVITY MEASURING APPARATUS AND METHOD

BACKGROUND OF THE INVENTION

1. Field of the Invention

The invention is related to the field of electrical resistivity well logging apparatus and methods. More specifically, the invention is related to apparatus and methods for determining the resistivity of earth formations in each one of a plurality of azimuthal segments around the circumference of a wellbore.

2. Description of the Related Art

A number of different types of well logging instruments are well known in the art for measuring the electrical resistivity of earth formations from within a wellbore drilled through these earth formations. These instruments include induction and galvanic (electrode) type devices. Most of the electrical resistivity well logging instruments known in the art, however, only measure variations in the resistivity axially with respect to the wellbore. The resistivity well logging instruments known in the art generally make measurements which reflect the assumption that the resistivity is azimuthally invariant with respect to the axis of the wellbore. Therefore these instruments typically do not provide any indication of azimuthal variations in the resistivity of the formation around the axis of the wellbore.

One instrument which can provide indications of azimuthal variation in the formation resistivity is described in U. S. Pat. No. 5,426,368 issued to Benimeli et al. This instrument includes a plurality of azimuthally segmented electrodes through which an electrical measuring current is passed. The measuring current is constrained generally to two distinct paths. The first path includes a return position at an electrode on the body of the instrument, this electrode being axially proximal to the azimuthally segmented electrodes so that most of the current in the first path flows through the fluid filling the wellbore. The second path is generally radially outward from the segmented electrodes so that the second current path includes both the wellbore and includes the earth formations through which the wellbore is drilled. The amount of the measuring current which passes through each of these electrodes, and the voltage drop associated with the measuring current flowing along the first path are used to calculate a fractional amount of the total resistivity derived signal which originates in the wellbore. The voltage drop associated with the second path includes effects of current flow in the wellbore and effects of current flow in the earth formations. By providing paths both including and excluding the effects of current flow in the earth formation, this instrument provides a means to account for the effects of irregular shape of the wellbore and/or eccentering of the instrument within the wellbore upon the individual azimuthally segmented measurements of resistivity.

The instrument disclosed in the Benimeli et al '368 patent, however, is subject to error in the azimuthally segmented resistivity measurements when the wellbore shape is highly irregular. This instrument is also subject to measurement error when the conductivity of fluid in the wellbore is low relative to the conductivity of the earth formations, because the voltage drop measurements used to determine the shape of the wellbore tend to be large relative to the voltage drop measurements from the earth formation under these conditions. Further, the instrument disclosed in the Benimeli et al '368 patent requires complex circuitry in order to measure two complete sets of current and voltage drop signals for each of the two current paths associated with each azimuthally segmented electrode.

The invention is intended to provide a way to measure azimuthal variations in the resistivity of earth formations with minimal effect of irregular wellbore shape and instrument eccentering. The invention is also intended to provide azimuthally segmented measurements of formation resistivity using greatly simplified electronic circuitry.

SUMMARY OF THE INVENTION

The invention is an instrument for measuring the resistivity of earth formations within azimuthal segments. The instrument includes azimuthally separated measure electrodes placed into contact with the wall of a wellbore penetrating the earth formations. The electrodes can be placed in contact with the wall of the wellbore by springs, hydraulics or other mechanisms known in the art. A guard electrode surrounds each of the measure electrodes. The instrument includes a booster current electrode axially spaced apart from the guard electrodes. An insulator axially separates the guard electrodes from the booster current electrode. Monitor electrodes are disposed on the exterior surface of the insulator. A first bucking current circuit is connected to the guard electrodes. The first bucking current is used for constraining the flow of the measuring currents emanating from each measure electrode to a path which is substantially perpendicular to the axis of the instrument. A booster current circuit is connected to the booster electrode. The booster current circuit is controllably operated to maintain substantially zero voltage drop across the monitor electrodes. The instrument includes first measuring current sources each connected to one of the measure electrodes, and circuits for measuring voltage and current emitted through each of the measure electrodes so that the resistivity of the segment in contact with each one of the measure electrodes can be determined.

In a preferred embodiment of the invention, the lengths of the booster electrode, the insulator and the guard electrodes are selected to enable accurate determination of the resistivity without the need to have the flow of bucking currents be symmetric along the axis of the instrument with respect to the measure electrodes.

The invention is also a method for determining, in azimuthal segments, the resistivity of earth formations penetrated by a wellbore. First measuring currents are imparted to the earth formations at azimuthally spaced apart locations on the wall of the wellbore at an axial position along an instrument axis. The instrument axis is substantially coaxial with the wellbore. A first focusing current is imparted to the earth formations proximal to the azimuthally spaced apart locations. The first focusing current confines the first measuring current to paths substantially perpendicular to the instrument axis. Second focusing currents are imparted to the earth formations at an axially spaced apart location from the first focusing current. Magnitude of the second focusing current is controlled to provide substantially zero potential difference at a location between where the second focusing current is imparted and where the first focusing current is imparted to the earth formation. Resistivity is calculated in an azimuthal direction of each one of the azimuthally spaced apart locations by measuring the voltage and the current magnitude of each one of the first measuring currents.

In a particular embodiment of the invention, second measuring currents are imparted to the azimuthally spaced apart locations. Voltage drops and current magnitudes of the second measuring currents are measured. A third focusing current is imparted proximally to the azimuthally spaced apart locations. The third focusing current is returned proximal to the axially spaced apart location where the second focusing current is imparted. Resistivity is then calculated from the voltage and current measurements of the second measuring currents. This resistivity calculated from the second measuring currents corresponds to a shallower radial depth in the earth formation than the resistivity calculated from the first measuring currents.

BRIEF DESCRIPTION OF THE DRAWINGS

FIGS. 3A and 3B show a functional block diagram of the instrument of the invention.

DESCRIPTION OF THE PREFERRED EMBODIMENT

Figures 1, 2:
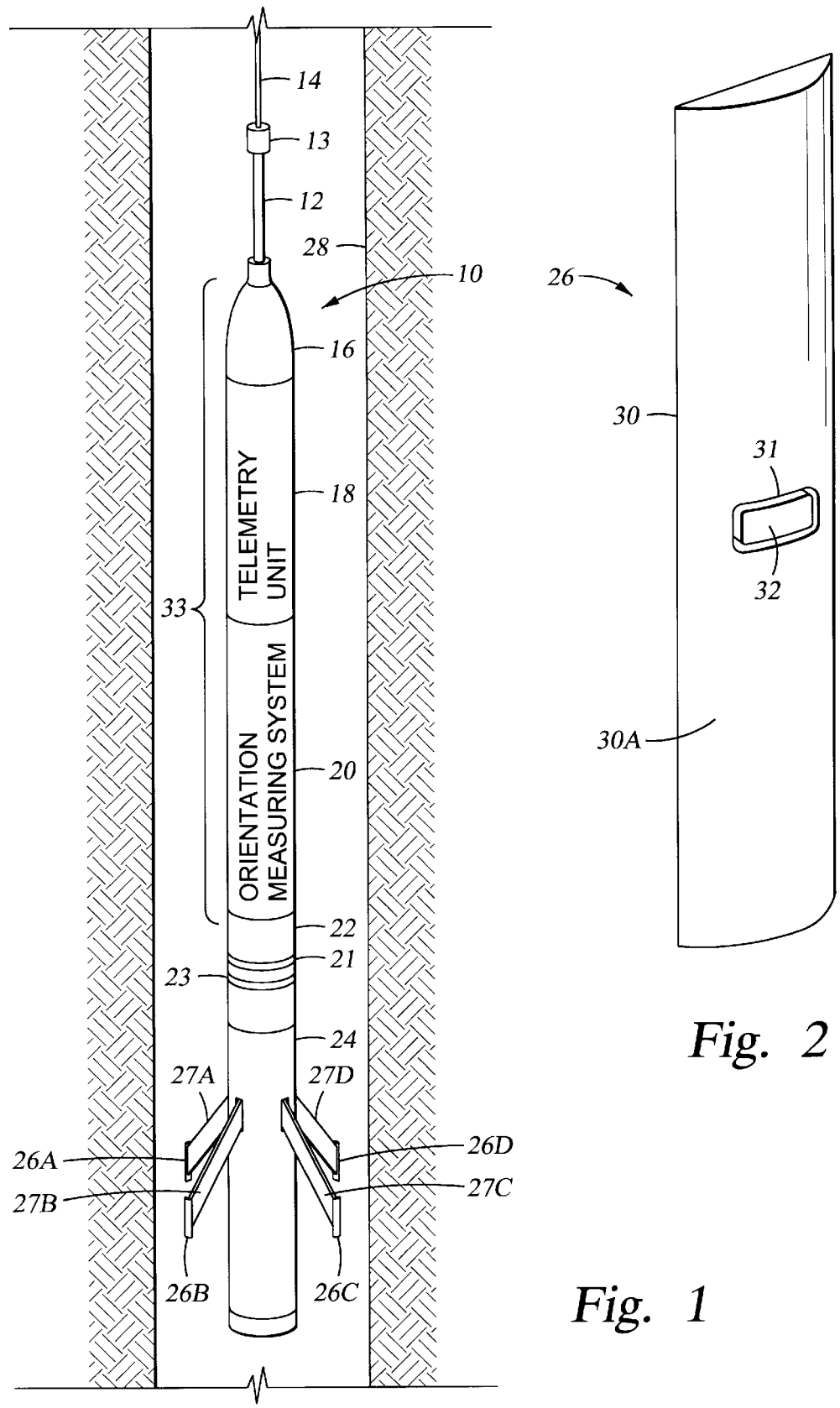
FIG. 1 shows an overview of the azimuthally segmented resistivity logging instrument of the invention.
FIG. 2 shows one of the electrode pads of the instrument of the invention in greater detail.

An overview of an azimuthally segmented electrical resistivity well logging instrument is shown in FIG. 1 at 10. The instrument 10 is shown suspended in a wellbore 28 from one end of an armored electrical cable 14. Insulated electrical conductors (not shown separately) disposed inside steel armor (not shown separately) on the cable 14 can be electrically connected to the instrument 10 through a cable connector known in the art as a bridle, shown generally at 12. The insulated electrical conductors (not shown separately) in the cable 14 transmit electrical power to the instrument 10 from the earth's surface, and can conduct measurement signals generated by the instrument 10 to the earth's surface for decoding and interpretation. The bridle 12 is electrically and mechanically coupled at one end to the top of the instrument 10 by a means of cable head 16. The bridle 12 is mechanically and electrically coupled to the cable 14 at its other end by a connector known in the art as a "torpedo" 13. The bridle 12 has electrical insulation on its exterior surface and is used to provide electrical isolation between the exterior of the instrument 10 (referred to as the "mass" of the instrument 10, and which is typically formed from electrically conductive metal), and the armor (not shown separately) on the cable 14. The significance of the electrical isolation provided by the bridle 12 will be further explained. The cable head 16 is also typically made of electrically conductive material such as steel. The cable head 16 makes electrical and mechanical connections between the instrument 10 and the bridle 12.

The instrument 10 can include a telemetry unit 18 which reformats measurement signals generated by the instrument 10 so that these signals may be efficiently transmitted to the earth's surface for decoding and interpretation. If the instrument 10 is designed to be controlled from the earth's surface, the telemetry unit 18 may also provide decoding and interpretation of command signals communicated from the earth's surface. Such functions of the telemetry unit 18 are well known in the art as are designs of typical electrical circuits used to perform these functions.

The instrument 10 can also include an orientation measurement system 20. The orientation measurement system 20 typically includes mutually orthogonal accelerometers (not shown separately) and mutually orthogonal magnetometers (not shown separately) of types well known in the art for measuring the relative orientation of the instrument 10 with respect to the earth's gravity and the earth's magnetic field. The measurements of gravity and magnetic field direction can be used to provide a directional reference for resistivity measurements made by the instrument 10. Typically the exterior housings of both the telemetry unit 18 and the orientation measuring system 20 are formed from electrically conductive, nonmagnetic materials such as stainless steel, monel, or titanium. Choice of materials for the orientation unit 20 housing is a matter of convenience for the system designer and is not meant to limit the invention. It is only necessary, when using magnetometers in the orientation system 20 for measurements of the earth's magnetic field, that the housing in which they are located is substantially non-magnetic.

The instrument 10 includes an electrode sub 24. The electrode sub 24 is also preferably composed of electrically conductive, non-magnetic materials such as stainless steel, monel, or titanium. The electrode sub 24 includes a plurality of linkages, shown at 27A–27D, oriented in azimuthally spaced apart directions around the circumference of the electrode sub 24. The linkages 27A–27D can be of types well known in the art for enabling a measure electrode pad, shown at 26A–26D, respectively, attached to the outer end of each linkage 27A–27D, to be radially extended from the body of the electrode sub 24 and placed into contact with the wall of the wellbore 28. The linkages 27A–27D can be radially extended using hydraulics, springs or other mechanisms well known in the art for this purpose.

An insulator sub 22 can be disposed between the electrode sub 24 and the orientation measuring system 20 to provide electrical mass isolation between the electrode sub 24, and the orientation measuring system 20 housing and any other conductive housing components located axially above the orientation system 20. The insulator sub 22 can include axially spaced apart, circumferential electrodes 21, 23 disposed on its outer surface. The circumferential electrodes 21, 23 will be referred to elsewhere in this description as "monitor" electrodes. The purpose for including the insulator sub 22 and the monitor electrodes 21, 23 will be further explained.

It should be clearly understood that the axial locations along the instrument 10 of the telemetry unit 18 and the orientation measuring system 20 are a matter of convenience for the system designer and are not to be construed as a limitation on the invention. For purposes of this invention, it is only necessary for the instrument 10 to include a length of electrically conductive housing, shown generally at 33, disposed axially above the insulator sub 22. As shown in FIG. 1, the overall length of this conductive housing 33 includes the lengths of the exterior housings of the telemetry unit 18 and the orientation system 20, as well as the cable head 16. As previously explained, however, the active electronic components of these systems (telemetry unit 18 and orientation system 20) need not be axially positioned as shown in FIG. 1. The conductive housing 33 is preferably axially located as shown to perform the function of a secondary focusing or "booster" electrode, as will be further explained. The preferred length of the conductive housing 33 will also be further explained.

It is also to be clearly understood that the number of linkages 27A–27D and correspondingly attached measure electrode pads 26A–26D as shown in FIG. 1 is not meant to be a limitation on the invention. The number of azimuthally spaced apart linkages and corresponding measure electrode pads is limited only as a practical matter by the available space on the electrode sub 24 to accommodate such linkages and electrode pads.

FIG. 2 shows one of the measuring electrode pads 26 in more detail. The measuring electrode pad 26 typically is formed into a pad mass 30 made from a conductive metal such as beryllium copper alloy, stainless steel or the like. The pad mass 30 includes a front surface 30A which preferably is in the form of a cylindrical section so that the front surface of the pad mass 30 may make well fitting mechanical contact with the wall of the wellbore (28 in FIG. 1). A measure electrode "button" 32 is disposed on the face of the pad mass 30, and is electrically isolated from the pad mass 30 by an insulator 31. The insulator 31 can be composed of epoxy or other materials well known in the art for electrically isolating the electrode button 32 from the pad mass 30 while maintaining the mechanical integrity of the assembled electrode button 32 and pad mass 30. Other configurations for the electrode pad are well known in the art and can include more than one measure electrode button disposed on the face of each pad mass, so the configuration of the electrode pad as shown in FIG. 2 is not to be construed as a limitation on the invention. It is only necessary that any measure electrode button disposed on the pad mass be substantially surrounded by the pad mass 30 so that, as will be further explained, the flow of electrical current from each electrode button used for measuring resistivity can be constrained by the flow of a primary focusing or "bucking" current directed from the pad mass 30 itself. The electrical connectins made to the pad mass 30 and the measure electrode button 32 will be further explained.

Figure 3A:
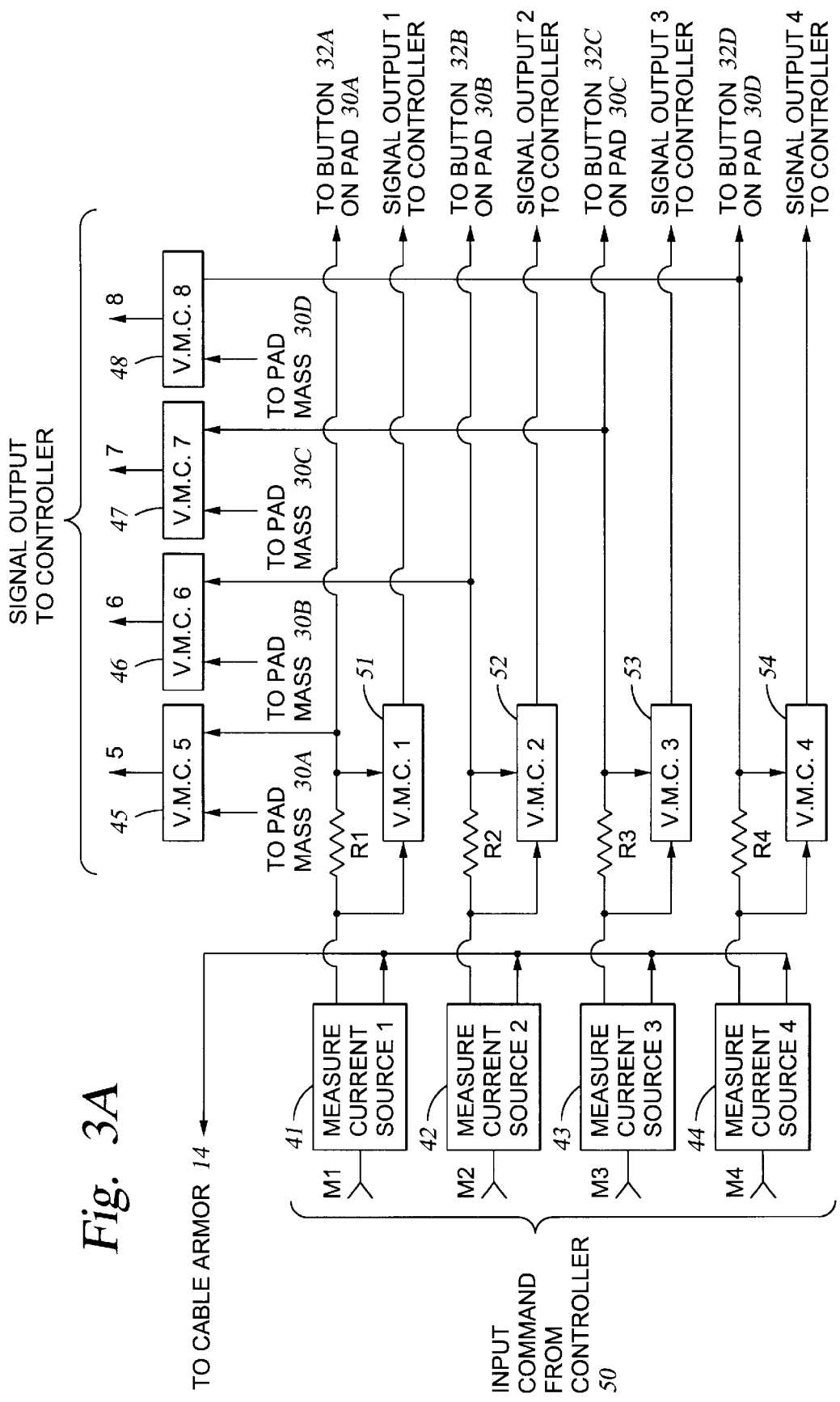

A functional block diagram of the instrument 10 is shown in FIGS. 3A and 3B. In FIG. 3A each one of the measure electrode buttons (32 in FIG. 2) on the electrode pads (26A–26D in FIG. 1) can be electrically connected, through a corresponding ballast resistor R1, R2, R3 and R4, to one terminal of a corresponding measure current source, shown at 41, 42, 43 and 44, respectively. The measure current sources 41, 42, 43 and 44 can be analog signal generators well known in the art, or preferably, digitally controlled signal synthesizers such as one described in U. S. Pat. No. 5,585,727 issued to Fanini et al. It is contemplated that the signals generated by the measure current sources 41, 42, 43 and 44 will include sine waves in a frequency range of about 30 to 35 Hz, which as is known in the art is commonly used for galvanic resistivity well logging measurements which have a relatively large radial depth of investigation. It is to be understood that the waveform and the frequency of the measure currents generated by the sources 41, 42, 43 and 44 is not meant to be a limitation on the invention. If the current sources used are as the ones described in the Fanini et al '727 patent, then the voltage output of each source 41, 42, 43 and 44 can be individually adjusted by means of a digital control signal from a controller 50. Control means for adjusting the signal output of analog voltage generators, if such are used for the measure current sources 41, 42, 43, 44, are well known in the art. The other functions of the controller 50 will be further explained.

The other output terminal of each source 41, 42, 43 and 44 can be connected to a measure current return location, which is preferably on the cable armor 14. The cable armor 14, as previously explained, is electrically isolated from the housing mass of the instrument 10 by the bridle 12. This enables electrical currents to flow radially outward into the earth formations for a significant distance before dispersion in the formations and eventual return to the cable armor 14. It may be preferable to return the current to the measure current sources 41, 42, 43, 44 through one of the insulated electrical conductors (not shown separately) in the cable 14 and connect this conductor to the cable armor at the earth's surface. When the measuring current is returned to the measure current sources 41–44 in this manner, the cable armor 14 will act as a diffuse current return location, thereby avoiding significant distortion of the measure current paths. As previously explained, the electrical mass of the cable head 16, and the connected telemetry unit 18 and orientation system 20, are isolated from the electrode sub 24 by the insulator sub (22 in FIG. 1) and so should not significantly distort the path of the measure current.

The input of voltage measuring circuits, shown at 51, 52, 53 and 54, respectively, can each be connected across a corresponding one of the ballast resistors R1, R2, R3, R4. This enables measuring the amount of current generated by each source 41, 42, 43 and 44, because the voltage drop across each resistor R1, R2, R3, R4 will be proportional to the current flow through each resistor R1, R2, R3, R4. The voltage measuring circuits 51, 52, 53 and 54 can be analog measuring circuits, or preferably can be digital voltage measuring circuits such as those described in the Fanini et al '727 patent, supra, since these are particularly well suited to measuring voltages any particular waveform and frequency selected for generation by the measure current sources 41–44. Each voltage measuring circuit 51, 52, 53 and 54 can provide a corresponding signal output to the controller 50 (shown in FIG. 3B) for storage and/or reformatting to be transmitted to the earth's surface by the telemetry unit (18 in FIG. 1).

The inputs of four additional voltage measuring circuits, 45, 46, 47, 48 can each be connected between one of the measure electrode buttons 32A–32D and the corresponding pad masses 30A–30D. The additional voltage measuring circuits 45, 46, 47, 48 can be analog types, or preferably the digital types described in the Fanini et al '727 patent, supra. Each of the additional voltage measuring circuits 45, 46, 47, 48 has a corresponding signal output directed to the controller 50 (shown in FIG. 3B).

Voltage measuring circuits 51, 52, 53, 54 as previously described provide a measurement related to the amount of measuring current flowing through each measure electrode button 32A–32D. Measuring circuits 45, 46, 47, 48 provide measurements of voltage difference between each electrode button 32A–32D and the corresponding pad mass 30A–30D. A bucking voltage measuring circuit 55 (shown in FIG. 3B) which will be further explained, has its inputs connected between cable armor 14 and the electrode sub 14. The bucking voltage measuring circuit provides a measurement of the voltage difference between the electrode sub and the cable armor 14. These sets of measurements can be combined to determine the apparent resistivity of the earth formation in contact with each measure electrode button 32A–32D. Since the measuring current flow path from each electrode button 32A–32D to the cable armor 14 substantially excludes the wellbore (28 in FIG. 1), the measurements of current and voltage difference at each electrode button substantially exclude the effects of the resistivity of the fluid in the wellbore 28, or the local geometry of the wellbore 28.

If the system designer chooses to include in the instrument 10 more than the four linkages (27A–27D in FIG. 1) and measure electrode pads (26A–26D in FIG. 1) as described herein, then each additional linkage and electrode should include a corresponding measure current source, ballast resistor, and two voltage measuring circuits connected as described herein for the four electrodes described in this embodiment of the invention.

The instrument 10 also includes a focusing or "bucking" current system. The bucking current system includes a source 56, which can be a type similar to any of the measure current sources, and the previously described bucking voltage measuring circuit 55 (shown in FIG. 3B), which can be a similar type to any of the other voltage measuring circuits. The input of the bucking voltage measuring circuit 55 is connected between the electrode sub 24, and the cable armor 14. As shown in FIG. 3B, the signal output from the bucking voltage measuring circuit 55, corresponding to the voltage difference between its input connections, is conducted to the controller 50. The controller 50, in turn is programmed to send command signals to the bucking current source 56, so that the amount of bucking current is maintained within the design range of each of the measuring circuits and current sources. The digital controls for the bucking system described herein are not meant to limit the invention. Also known in the art are analog feedback systems which will provide substantially the same type of bucking current level control.

If the system designer wishes to enhance the accuracy of the measurements made by the instrument 10, an individual bucking voltage measuring circuit could be provided for each one of the electrode pads and its corresponding electrode button. A pair of annular monitor electrodes can be disposed in the insulator (32 in FIG. 2) so as to circumscribe the electrode button. The annular electrodes would serve the purpose of measuring the voltage drop between the bucking current flowing from the pad mass and the measuring current flowing from the electrode button. The controller 50 could be programmed to operate the measuring current sources so that substantially zero voltage drop would be present between the annular monitor electrodes.

Referring back to FIG. 3A, the purpose of the bucking current system is to provide electrical constraint on the flow path of the measure current emanating from each electrode button 32A–32D so that a reasonable depth of penetration into the earth formation may be maintained. By maintaining substantially zero voltage drop between the electrode buttons 32A–32D and the corresponding pad masses 30A–30D (which are electrically and mechanically connected to the electrode sub 24), the measuring currents are constrained to flow substantially radially outward from the electrode buttons 32A–32D into the earth formations proximal to the wellbore (28 in FIG. 1). This purpose for the bucking current system is known in the art and is also well described in the Fanini et al '727 patent, supra. As previously explained, it is also desirable for the mass of each pad to substantially surround any electrode button disposed on the pad face. This constrains the flow of measure current both axially and radially, so that voltage drop and current measurements form each electrode button (32A–32D) will correspond only to the electrical resistivity of the formation in a discrete azimuthal segment proximal to that electrode button (32A–32D).

Because both the measure current and the bucking current return to the cable armor 14, it is desirable to further axially constrain the flow paths of both the measuring current and the bucking current by including a booster bucking current system. Referring again to FIG. 3B, the booster system includes a booster current source 57, which can be similar in design to the bucking current source 56, and a booster voltage measuring circuit 58, which can be similar in design to any of the other voltage measuring circuits described herein. The output of the booster source 57 is connected between the electrode sub 24 and the conductive housing 33. The measuring inputs of the booster measuring circuit 58 are connected across the monitor electrodes 21, 23. The output of the booster measuring circuit 58 is conducted to the controller 50, which adjusts the voltage output of the booster source 57 so that the voltage across the monitor electrodes 21, 23 remains substantially equal to zero. The booster system can augment the voltage level of the bucking current system because it is electrically isolated from the electrode sub 24 by the insulator sub 22. The booster current flowing from the conductive housing 33 at a potential sufficient to maintain substantially zero voltage drop across the monitor electrodes 21, 23 provides additional axial constraint on the flow of measuring and bucking currents into the formation. The additional axial constraint on the current path provides greater depth of investigation than would be the case without the booster system and assures that the measuring currents flow substantially perpendicularly outward from the axis of the instrument 10. The booster system also reduces current path distortion which would take place if the conductivity of fluid in the wellbore 28 is very high relative to the conductivity of the earth formations adjacent to the instrument 10.

Figure 4:
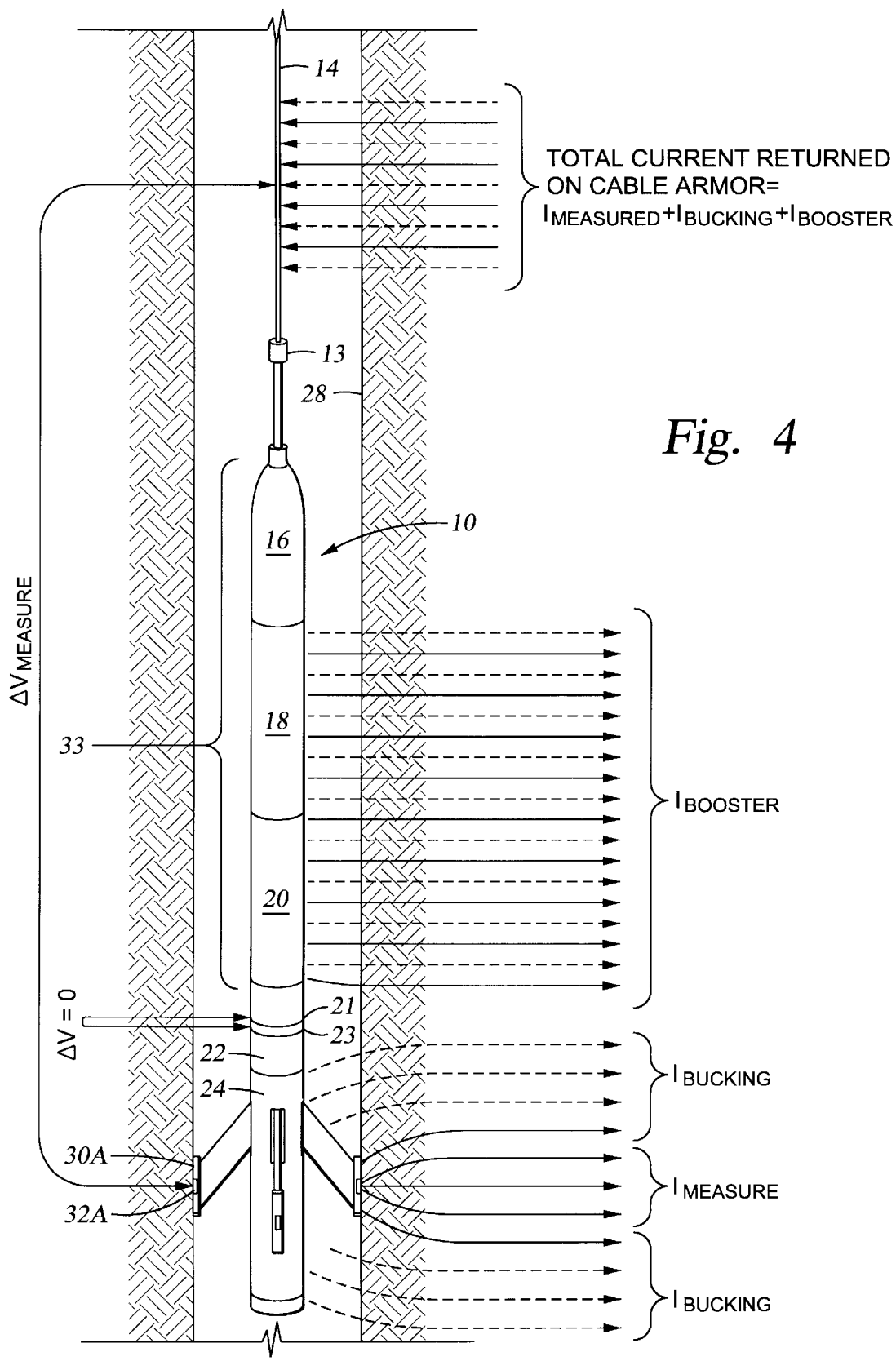
FIG. 4 shows the current flow paths for the measuring, bucking and booster currents in the instrument of the invention.

The current flow path as are shown in FIG. 4. Measure current $I_{measure}$ is shown flowing radially outward from one of the electrode buttons 32A. The bucking current $I_{bucking}$ is shown flowing radially away from the electrode sub 24 and from the pad mass 30A. Booster current $I_{booster}$ is shown flowing radially outward from the conductive housing 33. All three currents $I_{meassure}$, $I_{bucking}$ and $I_{booster}$ can be returned to the cable armor 14. The voltage drop $\Delta V_{measure}$ in the measure current is shown as being measured between cable armor 14 and the electrode button 32A for which the individual voltage drop measurement is to be made. The voltage drop $\Delta V_{measure}$ represents the sum of the voltage difference between the cable armor 14 and the electrode sub 24 and the voltage difference between the electrode sub 24 and the measure electrode button 32A. As previously explained, one individual voltage drop measurement can be made for each electrode button and the associated measure current circuits.

Figure 5:
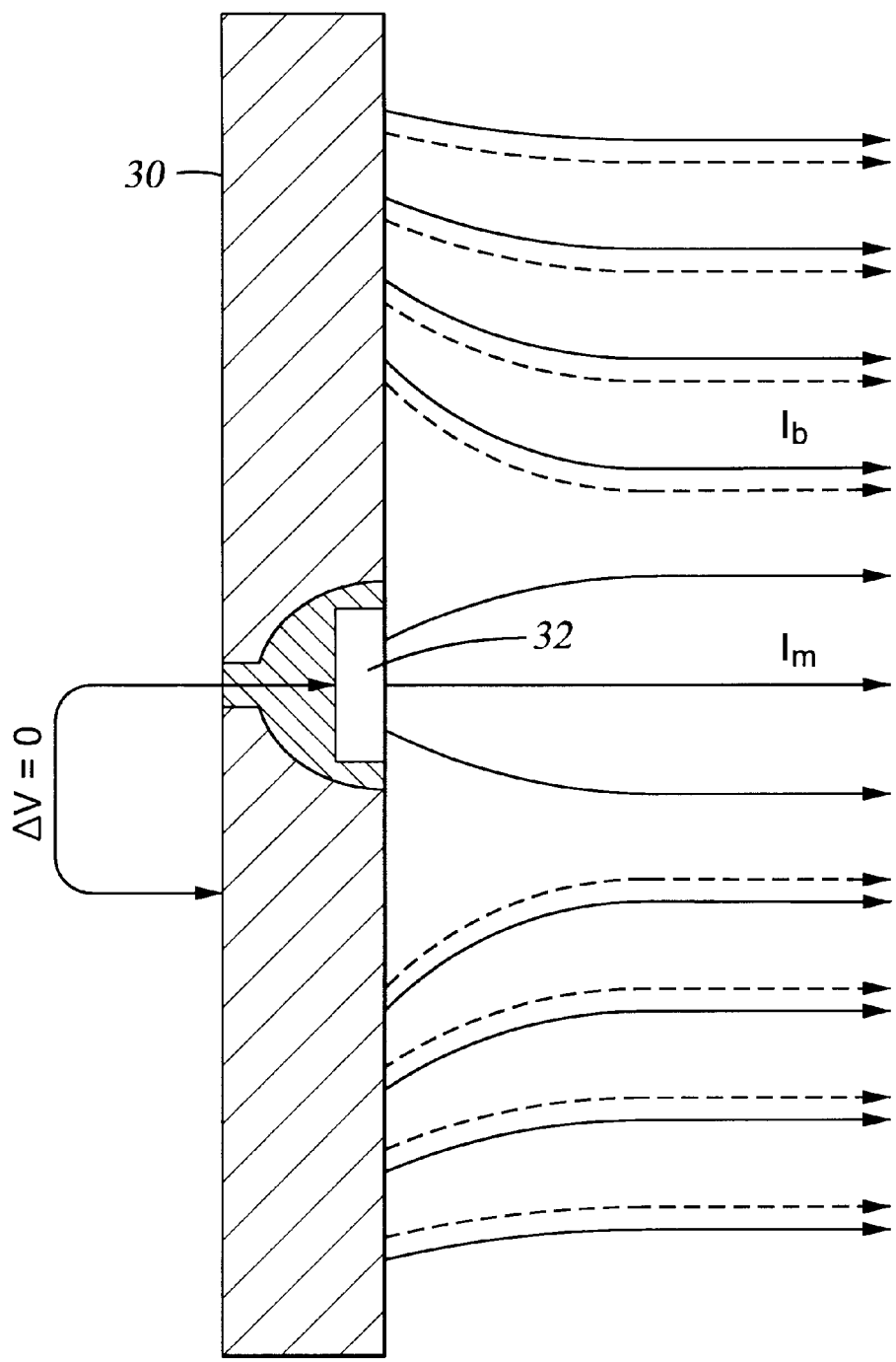
FIG. 5 shows the flow path of bucking and measuring current from each one of the electrode pads on the instrument of the invention.

FIG. 5 shows the flow of measure and bucking currents from one of the electrode pads 26. The voltage drop between the pad mass 30 and the electrode button 32 can be measured so that the controller 50 can adjust the output of the measure current source (such as 41 in FIG. 3 in this example) to provide substantially zero voltage drop between the pad mass 30 and the electrode button 32. This provides substantially radially outward flow of both the measuring current and the bucking current into the formation directly in contact with the electrode pad 26. By providing substantially radial current flow, the formation resistivity can be measured with relatively large radial depth of investigation. The principle will be familiar to those skilled in the art as that of a "deep laterolog".

Referring once again to FIG. 4, it will be readily apparent to those skilled in the art that the bucking current system and the booster current system are asymmetric with respect to the axis of the instrument 10. Prior art "dual laterolog" resistivity instruments generally include bucking and booster current systems for the deeper radial investigating resistivity measurement (generally called the "deep laterolog") whereby the electrical functions of the conductive housing 33, the insulator sub 22 and the monitor electrodes 21, 23 are axially symmetric with respect to the measure current electrode. This symmetry was thought to be necessary in order to insure that the measure current flows radially outward in a direction substantially perpendicular to the axis of the instrument 10. It has been determined, however, that by appropriate selection of active electrical lengths of the conductive housing 33, the insulator sub 22 and electrode sub 24, it is not necessary to provide symmetric distribution of the bucking current and booster current flow in order to provide a substantially accurate deep investigating resistivity measurement. In this embodiment of the invention the electrode sub 24 is about 5 feet long overall, the insulator sub 22 is about 2½ feet long and the conductive housing 33 is about 24 feet long. These lengths are representative values for a system which will provide accurate deep resistivity measurements using asymmetric booster and bucking current systems and are not meant to strictly limit the invention. Other lengths for the insulator 22, conductive housing 33 and electrode sub 24 can be determined by electric field modeling techniques well known in the art or by laboratory experimentation using various lengths of these components.

It will be readily appreciated by those skilled in the art that a second set of measure current and bucking current systems for each electrode pad 26 can be provided. Preferably the second measuring and bucking current systems should operate at a different frequency, as described for example in the Fanini et al '727 patent, supra. Typical operating frequencies for such second current systems are in the range of about 500 to 5000 Hz. This would enable the second current system to use alternate points of return for the measuring current and the bucking current to provide a different radial depth of investigation for the measuring current. The second set of current systems, for example, can be configured to have the bucking current (at the second frequency) flow between the electrode sub 24 and the conductive housing 33. Measuring current (at the second frequency) can still be applied to the measure electrode buttons (such as 32A–32D in FIG. 3) on each pad, and can be returned at the cable armor 14 as for the first set of current systems (at the 30–35 Hz first frequency) or alternatively can be returned to the conductive housing 33. Returning the bucking current to the conductive housing 33 provides radially shallower "defocusing" or diffusion of the measuring current in the earth formation, so that the radial depth of investigation of the resistivity measurement will be shallower than for the measuring current at the first frequency. The nature of the measuring current defocusing is described in the Fanini et al '727 patent.

Those skilled in the art will devise other embodiments of this invention which do not depart from the spirit of the invention as disclosed herein. Accordingly, the invention should be limited in scope only by the attached claims.

What is claimed is:

1. An instrument for measuring resistivity of earth formations within azimuthal segments around a wellbore penetrating said formations, comprising:
   measure electrodes placed in contact with a wall of said wellbore at azimuthally spaced apart locations;
   a guard electrode surrounding each of said measure electrodes;
   a booster electrode axially spaced apart from said guard electrodes;
   an insulator axially electrically separating said guard electrodes from said booster electrode;
   monitor electrodes disposed on said insulator;
   first measuring current sources each connected to one of said measure electrodes;
   a first bucking current source connected to said guard electrodes for constraining said measuring currents to paths substantially perpendicular to an axis of said instrument;
   a booster current source connected to said booster electrode and controllably operated to maintain substantially zero voltage drop across said monitor electrodes; and
   circuits for measuring voltage and current emitted through each of said measure electrodes whereby said resistivity of said segment in contact with each of said measure electrodes can be determined.

2. The instrument as defined in claim 1 wherein lengths of said booster electrode, said guard electrodes and said insulator are selected to substantially constrain said measure current to paths perpendicular to said axis of said instrument when flow of said booster current and said bucking current is asymmetric about said axis of said instrument.

3. The instrument as defined in claim 1 further comprising an orientation measuring system whereby orientations of said measurements of resistivity can be determined with respect to directions of earth's gravity and earth's geomagnetic field.

4. The instrument as defined in claim 1 further comprising second measuring current sources each connected to one of said measure electrodes, and a second bucking current source, said second bucking current source connected between said guard electrodes and said booster electrode, whereby said measuring current from said second sources disperses in said earth formation at a closer radial distance from said axis of said instrument to provide measurements of said resistivity having a relatively shallow radial depth of investigation.

5. The instrument as defined in claim 4 wherein said second measure current sources and said second bucking source operate in a frequency range of about 500 to 5000 Hz.

6. The instrument as defined in claim 4 wherein said first measure current sources, said first bucking source and said booster source operate in a frequency range of about 30 to 35 Hz.

7. A method for determining in azimuthal segments resistivity of earth formations penetrated by a wellbore, comprising:
   imparting first measuring currents to said earth formations at azimuthally spaced apart locations on a wall of said wellbore at a position along an instrument axis, said instrument axis substantially coaxial with said wellbore;
   imparting a first focusing current to said earth formations proximal to said azimuthally spaced apart locations, said first focusing current confining said first measuring currents to paths substantially perpendicular to said instrument axis;
   imparting a second focusing current to said earth formations at an axially spaced apart location from said first focusing current, a magnitude of said second focusing current controlled to provide substantially zero potential difference at a location between where said second focusing current is imparted and where said first focusing current is imparted to said earth formation; and
   calculating said resistivity in an azimuthal direction of each one of said azimuthally spaced apart locations by measuring voltage and current magnitude of each of said first measuring currents.

8. The method as defined in claim 7 wherein said first measuring current, said first focusing current and said second focusing current comprise a frequency of about 30 to 35 Hz.

9. The method as defined in claim 7 further comprising:
   imparting second measuring currents to said azimuthally spaced apart locations and measuring voltage drops and current magnitudes thereof;

imparting a third focusing current proximal to said azimuthally spaced apart location, said third focusing current returned proximal to said axially spaced apart location where said second focusing current is imparted; and calculating said resistivity from said measurements of said second measuring currents, said resistivity calculated from said second measuring currents corresponding to a shallower radial depth in said earth formation than said resistivity calculated from said first measuring currents.

10. The method as defined in claim 9 wherein said second measuring currents and said third focusing current comprise a frequency of about 500 to 5000 Hz.

11. The method as defined in claim 7 further comprising measuring directions of earth's gravity and earth's magnetic field with respect to said azimuthally spaced apart locations and calculating an orientation of said resistivity in each of said azimuthal segments with respect to said directions of gravity and magnetic field.

* * * * *